Nov. 28, 1967  M. KRIEGL  3,354,781
APPARATUS FOR CLAMPING GEARS AND THE LIKE
Filed Oct. 23, 1965  3 Sheets-Sheet 1

INVENTOR.
MAX KRIEGL
BY *Michael S. Striker*
ATTORNEY

INVENTOR.
MAX KRIEGL
BY Michael S. Striker
ATTORNEY

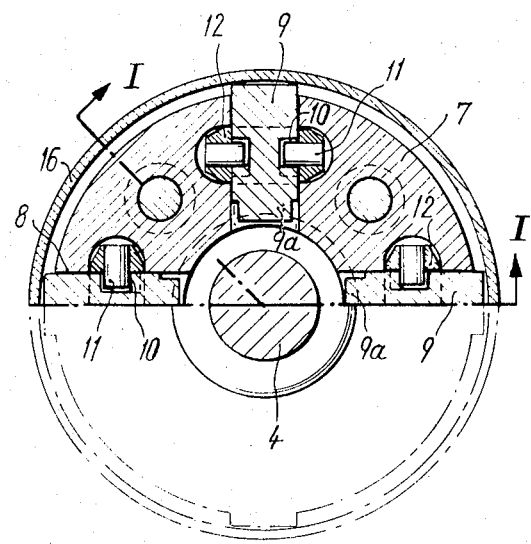

United States Patent Office 3,354,781
Patented Nov. 28, 1967

3,354,781
APPARATUS FOR CLAMPING GEARS
AND THE LIKE
Max Kriegl, Munich, Germany, assignor to Carl Hurth, Maschinen- und Zahnradfabrik, Munich, Germany
Filed Oct. 23, 1965, Ser. No. 503,158
Claims priority, application Germany, Nov. 14, 1964, H 54,309
15 Claims. (Cl. 90—1)

ABSTRACT OF THE DISCLOSURE

An apparatus for clamping annular workpieces between a pair of supports movable toward and away from each other in which a mandrel is reciprocably arranged in one of the supports so that a head of the mandrel may move through and beyond the workpiece resting on the one support and in which clamping members carried by the other of the supports are arranged to move in the path of the head so as to couple the mandrel to the other support and to that the latter may be moved toward the one support by movement of the mandrel.

---

The present invention relates to machine tools in general, and more particularly to an improved apparatus for clamping gear blanks and similar annular workpieces, especially in gear shaving, hobbing and other gear treating machines. Still more particularly, the invention relates to improvements in gear clamping and centering apparatus of the type disclosed, for example, in U.S. Patent No. 3,200,711 to Rogg, granted Aug. 17, 1965.

Heretofore known clamping apparatus for use in gear shaping machines are not entirely satisfactory because they are either too sensitive, too complicated or too expensive. Also, many heretofore known apparatus cannot be used for clamping different sizes of workpieces, or they must be operated partly by hand.

Accordingly, it is an important object of the present invention to provide a novel and improved clamping apparatus which can be used to clamp one or more workpieces at a time, which is relatively simple and can be installed in many presently known gear treating machines or other machine tools, which can effect a highly satisfactory clamping action simultaneously with proper centering of one or more workpieces, and which, if desired, can be operated in a fully automatic way.

Another object of the invention is to provide a clamping apparatus of the just outlined characteristics wherein the workpiece itself serves to initiate the clamping action and wherein such clamping action is automatically terminated when the workpiece is properly held on its support.

A further object of the invention is to provide a combined clamping and centering apparatus for annular workpieces and to construct and assemble the apparatus in such a way that its parts occupy little room and that the workpiece or workpieces are readily accessible to be treated by one or more hobs, shaving cutters or other types of tools.

An additional object of the invention is to provide a combined clamping and centering apparatus wherein the centering operation is incidental to the clamping operation and is carried out in a fully automatic way in response to manipulation of the clamping unit.

A concomitant object of the invention is to provide a novel clamping unit which may be used in an apparatus of the above outlined characteristics.

Briefly stated, one feature of my present invention resides in the provision of an apparatus for clamping gear blanks and similar annular workpieces. The apparatus comprises a first support (for example a work support mounted at the end of a work spindle in a gear shaving or hobbing machine), a second support (for example, a slide or headstock reciprocably mounted on the column of a gear shaving or hobbing machine), one of the supports being movable toward and away from the other support and the first support being arranged to support a workpiece adjacent to the second support, a mandrel reciprocably received in the first support and movable through and partially beyond the workpiece, a carrier mounted on the second support opposite the workpiece and arranged to accommodate the head of the mandrel when the latter is caused to move its head beyond the workpiece, at least one clamping member in the form of a bolt or the like which is mounted on the carrier for radial or substantially radial movement toward and away from the axis of the mandrel, and co-operating cam and follower means one of which is provided on the clamping member and the other of which is provided on the carrier. The one means (for example, the follower means) is movable axially with reference to the carrier (and hence also with reference to the clamping member) in response to engagement with the workpiece (i.e., in response to movement of the one support toward the other support and through such a distance that the one support continues to move toward the other support when the one means already abuts against the workpiece), and the cam and follower means being arranged to co-operate in such a way that the clamping member moves into the path of the head on the mandrel to prevent its withdrawal from the carrier in response to the aforementioned relative movement between the carrier and the one means. If the mandrel is then moved in a direction away from the second support and to such an extent that its head abuts against the clamping member, the workpiece is properly held against axial movement with reference to the first support.

The novel features which are considered as characteristic of the invention are set forth in particular in the appended claims. The improved clamping apparatus itself, however, both as to its construction and its mode of operation, together with additional features and advantages thereof, will be best understood upon perusal of the following detailed description of a specific embodiment with reference to the accompanying drawings, in which:

FIG. 3 is a vertical section as seen in the direction of arrows from the line III—III of FIG. 1.

Figure 1:
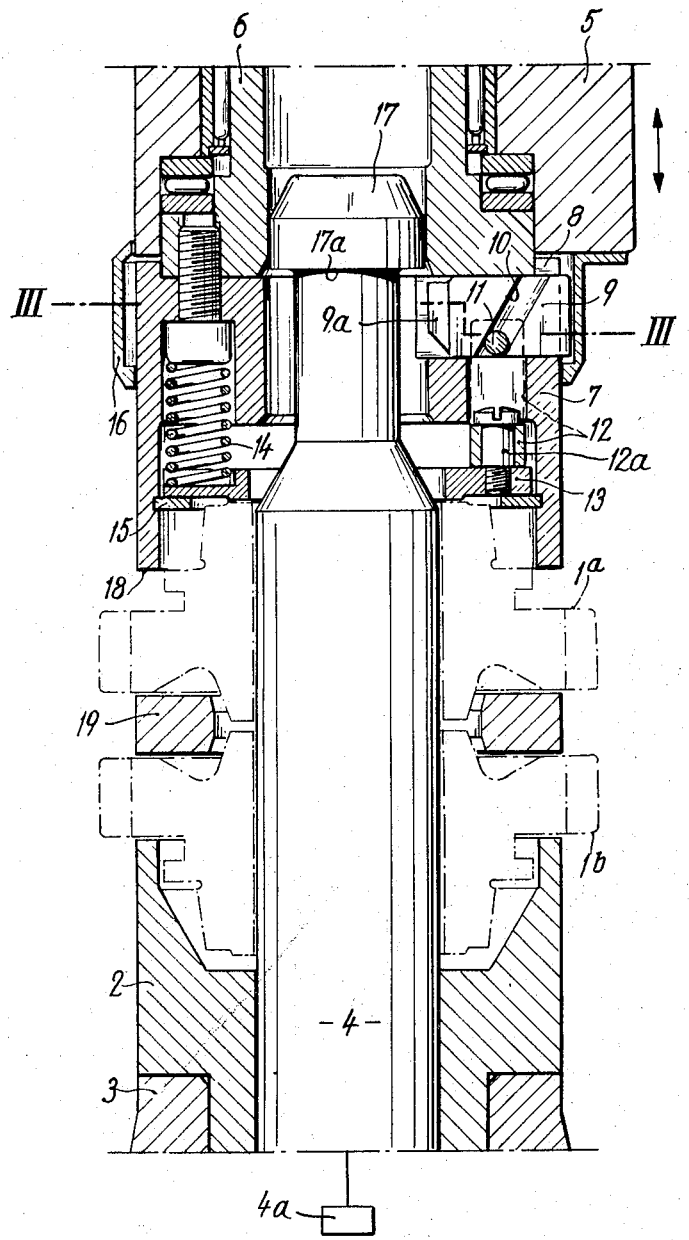
FIG. 1 is an axial section through a clamping apparatus which embodies my invention, one of the clamping members being shown in retracted position, line I—I of FIG. 3.

Referring first to FIG. 1, there is shown an apparatus for centering and clamping gear-shaped annular workpieces or blanks 1a, 1b. In the illustrated embodiment, the apparatus is used for simultaneously clamping two annular workpieces but it will be readily understood that a single workpiece can be centered and clamped just as well. The lower workpiece 1b rests on a work support 2 which is fixed to the upper end portion of a work spindle 3. The centering operation is carried out by a reciprocable arbor 4 which may be moved through and upwardly beyond the parts 3, 2, 1b and 1a in the just described sequence. The upper portion 17 of the arbor 4 constitutes a head and forms part of the means for clamping the workpieces 1a, 1b in requisite position. The remainder of the clamping means is shown in the upper portion of FIG. 1 and comprises the following components:

A slide here shown as a headstock 5 is mounted on the frame (not shown) of the gear shaping machine and is movable up and down, i.e., in the axial direction of the arbor 4. This headstock accommodates a rotary spindle sleeve 6 which may be used with particular advantage when the improved apparatus is installed in a gear hobbing machine. One of the parts 5, 6 supports a downwardly extending tubular carrier 7 which is provided with radially extending preferably prismatic guide means 8 for guiding a plurality of equidistant radially movable clamping bolts 9 (only one shown). Each clamping bolt is provided with a cam groove or slot 10 which is inclined with reference to the axis of the arbor 4. Each cam slot 10 accommodates a pin-shaped follower 11 and each of these followers is fixed to a U-shaped holder or yoke 12. The webs of the yokes 12 are secured to a ring 13 by means of screws or bolts 12a, and the ring 13 is reciprocable in the carrier 7. The parts 11, 12, 12a, 13 together constitute a unit which will be called a follower means. One or more springs 14 are inserted into the carrier 7 to bias the ring 13 in a direction toward the work support 2, i.e., away from the headstock 5. The downward stroke of the ring 13 is limited by a stop 15, e.g., a split ring which is recessed into a groove provided in the internal surface of the carrier 7. A cylindrical shield 16 surrounds the guide means 8 to protect the clamping bolts 9 against entry of foreign matter.

The numeral 19 denotes a distancing element which is inserted between the workpieces 1a, 1b.

The operation of the improved apparatus is as follows:

Prior to clamping, the headstock 5 is moved to its upper end position, i.e., away from the work support 2. Also, the arbor 4 is retracted to its lower end position so that the workpieces 1a, 1b may be placed onto the work support 2. In the next step, the arbor 4 is moved upwardly (for example, by a mechanism as disclosed in U.S. Patent No. 3,200,711 to Rogg) until the head 17 assumes a position at a level above the upper workpiece 1a. The headstock 5 is then moved downwardly so that the underside of the ring 13 abuts against the upper end face of the workpiece 1a and the head 17 enters the bore of the spindle sleeve 6. This insures that the workpieces 1a, 1b are properly centered because the head 17 is received in the spindle sleeve 6 with a negligible clearance. Such position of the apparatus is shown in FIG. 1. It is to be noted that the centering of workpieces 1a, 1b by means of the components 6, 17 constitutes an optional feature of the present invention because such centering can be achieved in a number of ways, or the centering action can be incidental to the clamping action. For example, the head 17 could have a conical tip which would enter into a conical recess at the underside of a component serving to replace the spindle sleeve 6. During centering, the clamping bolts 9 are held in their radially outermost positions so that the head 17 is free to pass therebetween and into the bore of the spindle sleeve 6. Since the sleeve 6 is rigid with the carrier 7, it can be said to constitute a part thereof or vice versa. Also, the sleeve 6 and carrier 7 can be said to form part of the headstock 5.

If the operator continues to move the headstock 5 downwardly, the ring 13 cannot share such downward movement because it rests on the upper end face of the workpiece 1a so that the carrier 7 moves with reference to the ring 13 and causes the clamping bolts 9 to slide with reference to the followers 11. Such relative movement between the clamping bolts 9 and the followers 11 causes the bolts to move radially inwardly, see FIG. 2. The downward movement of the headstock 5 is terminated when the lower end face 18 of the carrier 7 comes into actual abutment with a shoulder of the workpiece 1a. The followers 11 then extend into the uppermost portions of the cam slots 10, i.e., the clamping bolts 9 are held in their radially innermost positions and their projections 9a engage a shoulder 17a of the head 17 as soon as the latter is moved downwardly to take the position shown in FIG. 2. The arbor 4 is moved downwardly with a certain force so that it presses the lower end face 18 of the carrier 7 against the upper workpiece 1a whereby the workpieces 1a, 1b are properly centered and clamped in requisite positions for engagement by a shaving or other tool, not shown.

The unclamping operation is carried out by reversing the above steps, i.e., the arbor 4 is moved upwardly to move the shoulder 17a of the head 17 away from the projections 9a, the headstock 5 is then moved upwardly so as to allow for expansion of springs 14 with the result that the clamping bolts 9 move radially outwardly and out of the path of the head 17, and the arbor 4 is moved downwardly to withdraw the head into the work support 2. The workpieces 1a, 1b are then accessible and may be removed by hand or by a transfer mechanism, not shown.

Figure 2:
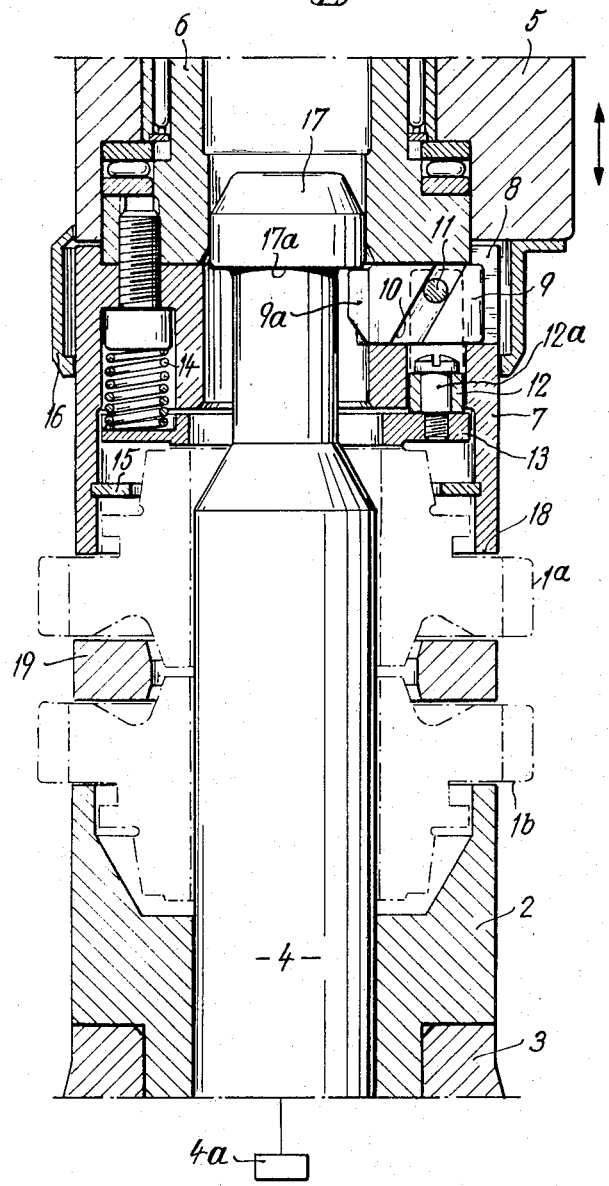
FIG. 2 illustrates the apparatus in operative position.

The arbor 4 may be reciprocated by a hydraulic, pneumatic or mechanical reciprocating device 4a shown schematically in FIGS. 1 and 2. If the device 4a is of the mechanical type, it may comprise an electric drive motor.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. An apparatus for clamping annular workpieces, comprising a first support; a second support, one of said supports being movable toward and away from the other support and said first support being arranged to support a workpiece adjacent to said second support; a mandrel reciprocably received in said first support and having a head movable through and beyond the workpiece; a carrier provided on said second support and arranged to accommodate said head; at least one clamping member radially movably mounted in said carrier; cam means and follower means cooperating with said cam means, one of said means being provided on said clamping member and the other of said means being axially movably mounted in said carrier and being arranged axially movable with reference to said carrier in response to abutment with the workpiece and continued movement of said one support toward said other support, said cam and follower means being arranged to shift said clamping member inwardly and into the path of said head in response to said abutment of said other means with the workpiece and relative movement between said carrier and said other means.

2. An apparatus as set forth in claim 1, comprising a plurality of clamping members and co-operating cam and follower means for each of said clamping members.

3. An apparatus as set forth in claim 1, wherein said carrier is provided with guide means for said clamping member and wherein said other means is arranged to abut against one end face of an annular workpiece on said first support in response to movement of said one support toward said other support.

4. An apparatus as set forth in claim 1, wherein said other means comprises a ring axially movably received in said carrier and a pin supported by said ring, said one means being a cam slot provided in said clamping member and being inclined with reference to the axis of said mandrel, said pin extending into said cam slot.

5. An apparatus as set forth in claim 4, further comprising means for yieldably biasing said ring in a direction toward said first support.

6. An apparatus as set forth in claim 1, further comprising resilient means for biasing said other means toward said first support and stop means for arresting said other means in an end position from which said other means is displaced in response to movement of said one support toward said other support subsequent to engagement of said other means with the workpiece.

7. An apparatus as set forth in claim 1, further comprising a spindle sleeve rotatably mounted in said second support and rigid with said carrier.

8. An apparatus as set forth in claim 7, wherein said spindle sleeve is provided with a bore arranged to accommodate said head and to thereby center said mandrel with reference to said carrier.

9. An apparatus as set forth in claim 8, wherein said head is provided with a shoulder facing said first support and said clamping member comprises a projection which is engaged by said shoulder when the mandrel is moved away from said second support subsequent to radially inward movement of said clamping member.

10. An apparatus as set forth in claim 1, wherein said second support is a slide which is reciprocable toward and away from said first support in the axial direction of said mandrel.

11. An apparatus as set forth in claim 1, further comprising a shield surrounding said carrier to protect said clamping member against the entry of foreign matter.

12. An apparatus as set forth in claim 1, wherein said mandrel is vertical and said head is provided at the upper end thereof.

13. An apparatus as set forth in claim 1, wherein said carrier is rotatable with reference to said second support about the axis of said mandrel.

14. An apparatus as set forth in claim 1, further comprising means for reciprocating said mandrel.

15. An apparatus as set forth in claim 1, wherein said one support is arranged to support a plurality of coaxial annular workpieces at a time.

References Cited

FOREIGN PATENTS 1,035,450    7/1958    Germany.

GERALD A. DOST, *Primary Examiner.*